(12) United States Patent
Rapalli et al.

(10) Patent No.: US 12,073,121 B2
(45) Date of Patent: Aug. 27, 2024

(54) COMMAND TIMER INTERRUPT

(71) Applicant: Micron Technology, Inc., Boise, ID (US)

(72) Inventors: Chandrakanth Rapalli, Hyderabad (IN); Yoav Weinberg, Toronto (CA); Tal Sharifie, Lehavim (IL)

(73) Assignee: Micron Technology, Inc., Boise, ID (US)

( * ) Notice: Subject to any disclaimer, the term of this patent is extended or adjusted under 35 U.S.C. 154(b) by 126 days.

(21) Appl. No.: 18/048,292

(22) Filed: Oct. 20, 2022

(65) Prior Publication Data

US 2024/0134567 A1 Apr. 25, 2024
US 2024/0231685 A9 Jul. 11, 2024

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0673* (2013.01)

(58) Field of Classification Search
CPC .... G06F 3/0659; G06F 3/0604; G06F 3/0631; G06F 3/0673

USPC ......................................................... 711/154
See application file for complete search history.

(56) References Cited

U.S. PATENT DOCUMENTS 5,768,500 A * 6/1998 Agrawal ............... G06F 11/348
717/130
2019/0046373 A1 * 2/2019 Coulter .................. A61G 5/041

FOREIGN PATENT DOCUMENTS

CN 103197966 A * 7/2013 ............. G06F 13/24

* cited by examiner

*Primary Examiner* — Mardochee Chery
(74) *Attorney, Agent, or Firm* — Holland & Hart LLP

(57) ABSTRACT

Methods, systems, and devices for command timer interrupt are described. In some cases, a memory system having a host-driven logical block interface may maintain a timer to measure processing of commands. For example, upon receiving a command and storing the command in a command queue, a protocol controller of the memory system may issue the command to a command controller of the memory system and initiate the timer. Upon receiving a response for the command from the command controller, the protocol controller may reset or stop the timer, depending on whether the command queue is empty. If the timer expires prior to receiving a response for the command, the protocol controller may issue an interrupt signal to the command controller.

25 Claims, 6 Drawing Sheets

COMMAND TIMER INTERRUPT

FIELD OF TECHNOLOGY

The following relates to one or more systems for memory, including command timer interrupt.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Some memory systems may implement a host-driven packet based interface configured to receive commands and data packets from a host system, and transmit responses for the commands upon successfully processing the commands. Such memory systems may be incorporated in environments such as vehicle safety systems, autonomous vehicle systems, or other safety-critical systems that may have strict requirements. In some examples, as part of processing commands received from the host system, the memory system may stall or otherwise delay completion of commands. Some memory systems may not include a recovery mechanism for stalled commands, which may result in increased system latency or other delays which may impact safety-critical systems.

As described herein, a memory system having a host-driven logical block interface may maintain a timer to track processing of commands. For example, upon receiving a command and storing the command in a command queue, a protocol controller of the memory system may issue the command to a command controller of the memory system and initiate the timer. Upon receiving a response for the command from the command controller, the protocol controller may reset or stop the timer, depending on whether the command queue is empty. If the timer expires prior to receiving a response for the command, the protocol controller may issue an interrupt signal to the command controller. Accordingly, the memory system may take corrective action for stalled commands.

Figure 1:
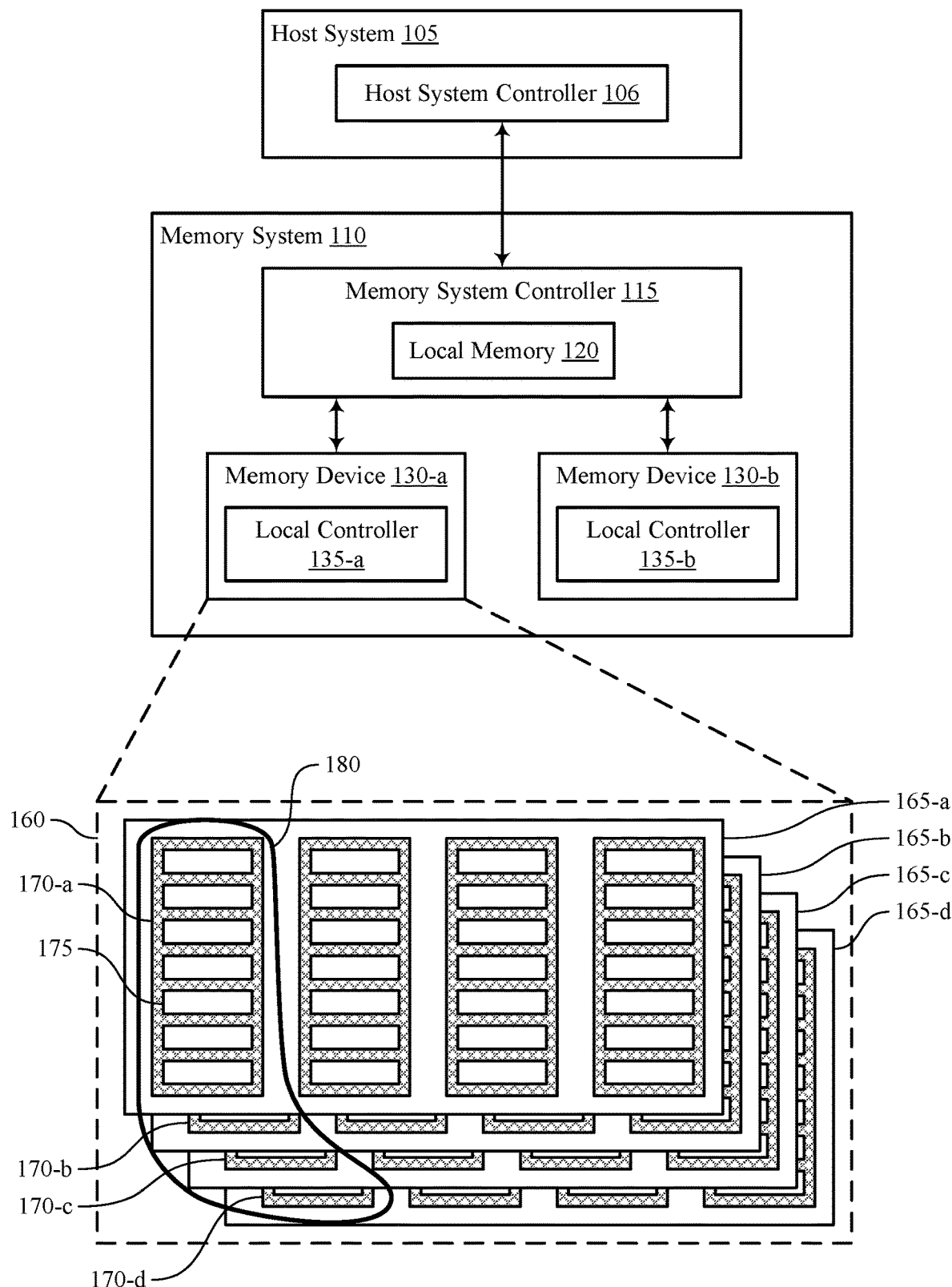
FIG. 1 illustrates an example of a system that supports command timer interrupt in accordance with examples as disclosed herein.
Figure 2:
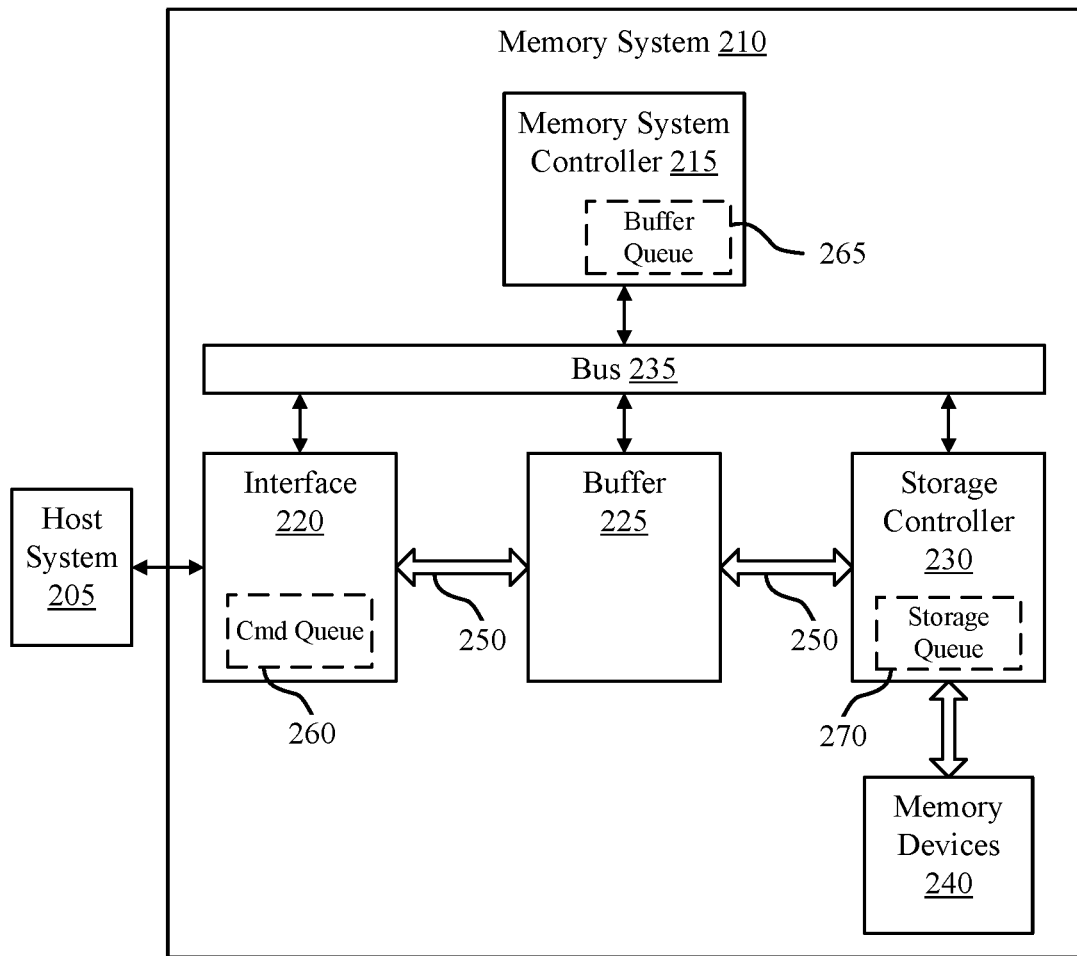
FIG. 2 illustrates an example of a system that supports command timer interrupt in accordance with examples as disclosed herein.

Features of the disclosure are initially described in the context of systems, devices, and circuits with reference to FIGS. 1 through 2. Features of the disclosure are described in the context of a system and a process flow with reference to FIGS. 3 through 4. These and other features of the disclosure are further illustrated by and described in the context of an apparatus diagram and flowchart that relate to command timer interrupt with reference to FIGS. 5 through 6.

FIG. 1 illustrates an example of a system 100 that supports command timer interrupt in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support command timer interrupt. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, a memory system 110 having a host-driven logical block interface may maintain a timer to measure processing of commands. For example, upon receiving a command and storing the command in a command queue, a protocol controller of the memory system 110 may issue the command to a command controller of the memory system and initiate the timer. Upon receiving a response for the command from the command controller, the protocol controller may reset or stop the timer, depending on whether the command queue is empty. If the timer expires prior to receiving a response for the command, the protocol controller may issue an interrupt signal to the command controller. Accordingly, the memory system 110 may take corrective action for stalled commands.

FIG. 2 illustrates an example of a system 200 that supports command timer interrupt in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on (e.g., using) the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) after the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some cases, a memory system 210 having a host-driven logical block interface may maintain a timer to measure processing of commands. For example, upon receiving a command and storing the command in a command queue 260, a protocol controller of the memory system 210 may issue the command to a command controller of the memory system and initiate the timer. Upon receiving a response for the command from the command controller, the protocol controller may reset or stop the timer, depending on whether the command queue 260 is empty. If the timer expires prior to receiving a response for the command, the protocol controller may issue an interrupt signal to the command controller. Accordingly, the memory system 210 may take corrective action for stalled commands.

Figure 3:
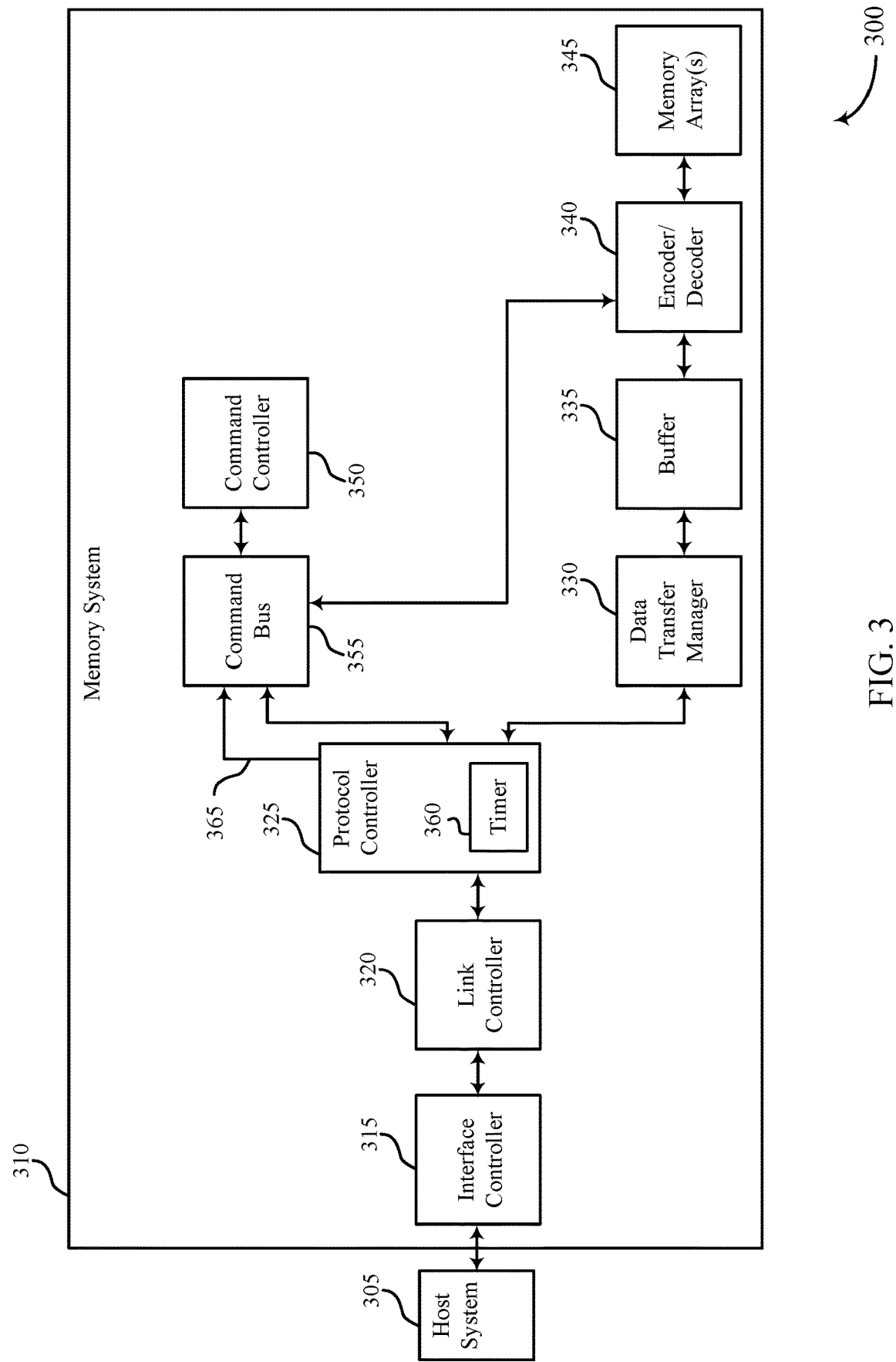
FIG. 3 illustrates an example of a system that supports command timer interrupt in accordance with examples as disclosed herein.

FIG. 3 illustrates an example of a system 300 that supports command timer interrupt in accordance with examples as disclosed herein. In some examples, the system 300 may include a host system 305 and a memory system 310. The host system 305 and the memory system 310 may be examples of the host system 205 and the memory system 210, respectively, as described with reference to FIG. 2. The memory system 310 may include an interface controller 315, a link controller 320, and a protocol controller 325. The memory system 310 may also include a data transfer manager (DTM) 330, a buffer 335, an encoder/decoder 340, and one or more memory arrays 345, which may be utilized for processing data. The interface controller 315, the link controller 320, the protocol controller 325, and the DTM 330 may be part of an interface 220 of FIG. 2. The buffer 335 may correspond to the buffer 225 of FIG. 2. The encoder/decoder 340 may be part of storage controller 230 of FIG. 2. The memory arrays 345 may include one or more memory devices, and each memory device may include one or more memory die (e.g., one or more NAND memory die).

The memory system 310 may include a command controller 350 and a command bus 355 which may be utilized for processing control information. The command controller 350 may correspond to the memory system controller 215 of FIG. 2. In some cases, the command controller 350 may include or may be an example of a processor executing instructions (e.g., controlled by software or firmware). Accordingly, the command controller 350 may stall during execution of the instructions. For example, the instructions may support multiple concurrent operations (e.g., operations running in parallel, multi-threaded operations), which may have non-deterministic timing, such that an operation or combinations of operations may stall the command controller. By implementing a timer-based interrupt signal for the command controller 350, the memory system 310 may take one or more actions to recover from stalling of the command controller 350.

The host system 305 may communicate with the memory system 310 via a host-driven logical block interface (e.g., an interface managed by the host system 305). For example, the host system 305 may transmit packets that include one or more payloads. As used herein, a data block may include data (e.g., data from respective payloads) from one or more packets received from the host system 305. In some instances, the payloads may be associated with respective commands (e.g., read commands, write commands, other commands) received from the host system 305. For example, the host system 305 may transmit a write command and one or more packets (e.g., that collectively correspond to a data block) to the memory system 310. Thus, a data block may refer to a unit of data transferred according to block access commands (e.g., a minimum addressable block size). The packets may be received by the interface controller 315 and commands included in the packets may be processed by the protocol controller 325.

In some examples, the host system 305 may communicate the packets to the interface controller 315, which may utilize a UniPro® protocol stack and may include a physical interface that includes one or more serial data lanes. As described herein, the interface controller 315 may be configured to generate protocol units (e.g., upon receiving a write command from the host system 305) and data units (e.g., upon receiving a read command from the host system 305) for communicating to the link controller 320 and the host system 305, respectively.

The memory system 310 may include a link controller 320 that is coupled with the interface controller 315. In some instances, the link controller 320 may be referred to as a Universal Flash Storage (UFS) link controller 320, and may operate according to a UFS protocol. The link controller 320 may receive protocol units from the interface controller 315, in the instance of a write operation, and may communicate the protocol units to the protocol controller 325. In the instance of read operations, the link controller 320 may receive protocol units from the protocol controller 325 and may communicate the protocol units to the interface controller 315.

In some examples, the memory system 310 may include a protocol controller 325 that is coupled with the link controller 320. The protocol controller 325 may operate according to a UFS protocol and may receive protocol units from the link controller 320 (e.g., during a write operation). As described herein, the interface controller 315 may utilize a UniPro® protocol stack. However, upon receiving a command (e.g., a read command) and performing certain operations on fields of the command to generate a protocol unit, the protocol unit may be communicated to the protocol controller 325 using signaling that is the same as or resembles UFS signaling (e.g., conforms to a UFS protocol). After the protocol controller 325 receives the protocol unit, it can either communicate the protocol unit to the DTM 330 if the protocol unit is associated with data or to the command controller 350 if the protocol unit is associated with control information.

The DTM 330 may receive (e.g., obtain) and process the protocol unit. In some examples, the DTM 330 may process one or more protocol units to obtain a data storage unit, which may be written to a memory array 345. For example, the DTM 330 may generate the data storage unit using one or more protocol units. Subsequently, the DTM 330 may generate respective sets of parity bits to compare with parity bits included in each protocol unit. That is, the DTM 330 may check the parity bits from the protocol units with parity bits generated from data bits of the data storage unit.

Additionally or alternatively, the protocol controller 325 may communicate a protocol unit associated with control information to the command controller 350. As used herein, the term control information may refer to any information associated with a command received from the host system 305 other than data to be read from or written to a memory array 345. In some examples, the protocol unit comprising the control information may be processed by the command controller 350 and may be communicated via a command bus 355. The command bus 355 may communicate the control information to a portion or component of the memory system 310 associated with the control information. The command bus 355 may be an example of the bus 235 of FIG. 2.

After generating the data storage unit that includes the data from the data block, the DTM 330 may break the data storage unit into one or more data words. As used herein, a data word may correspond to a size of data that is smaller than the data storage unit. Additionally or alternatively, each data word may be a same or a different size than a protocol unit. The respective data words may be transmitted by the DTM 330 to the buffer 335 (e.g., for storage in respective addresses of the buffer 335).

The command controller 350 may send an indication (e.g., via command bus 355) to the encoder/decoder 340 to retrieve the data words of the data storage unit from the buffer 335 and store the data words in the memory array(s) 345. The encoder/decoder 340 may read the codewords from the buffer 335. The encoder/decoder 340 may encode the data words according to a first error protection scheme to create codewords (e.g., first codewords) from each data word and may store the respective codewords to the memory array(s) 345 according to physical addresses of the memory array(s) 345 provided by the command controller 350. The first error protection scheme may be a linear block code (e.g., LDPC) that generates codewords with first error protection codes. For example, each codeword may include systematic bits and parity bits generated according to the first error protection scheme. Accordingly, the plurality of first codewords may be stored to the memory array(s) 345. The data associated with each codeword of the plurality of first codewords may be or may represent data associated with the data block received from the host system 305.

When the protocol controller 325 receives a command (e.g., from the link controller 320) associated with data to be accessed from the memory array 345, the protocol controller 325 may place the command in a command queue (e.g., command queue 260). For example, the protocol controller may allocate the command to the command queue (e.g., may add the command to the command queue) by storing the command in a buffer or register of the protocol controller 325.

The command controller 350 may then retrieve the command from the queue (e.g., via the command bus 355) and process the command. In some cases, processing the command may include moving the data associated with the command between one or more of the memory array 345, the buffer 335, and the encoder/decoder 340 (e.g., if the command is an access command). For example, the command controller 350 may determine a range of physical addresses of the memory array 345 storing data associated with the command using an indication of a range of logical addresses, such as a range of logical addresses included in the command. In some cases, determining the range of physical addresses may include mapping the range of logical addresses to the range of physical addresses, for example using a logical-to-physical (L2P) table.

Upon completion of the command (e.g., upon data associated with the command being successfully transferred), the command controller 350 may transmit a response for the command to the protocol controller 325 (e.g., via the command bus 355). The protocol controller 325 may send the response to the host system 305 (e.g., via link controller 320 and interface controller 315). Upon receiving the response, the protocol controller 325 may deallocate the command from the command queue (e.g., may remove the command from the command queue). For example, the protocol controller may free the buffer or register to which the command was written.

The protocol controller 325 may include a timer 360 used to determine whether commands issued to the command controller 350 have been stalled or otherwise delayed. For example, if the command queue is empty (e.g., if there are no commands currently stored to the command queue), then upon allocating a first command (e.g., upon storing a first command in the command queue) and the first command being transferred to the command controller, the protocol controller 325 may initiate the timer 360 (e.g., to a first value). The timer 360 may run until the value of the timer reaches a threshold (e.g., until the timer expires). Upon the timer 360 expiring, the protocol controller 325 may issue an interrupt signal 365 to the command controller 350 (e.g., via the command bus 355), and the command controller 350 may take one or more actions in response to the interrupt signal 365. For example, the command controller 350 may implement a interrupt handling routing to interrupt execution of one or more threads of operations of the command controller 350 and evaluate a status of the one or more threads. Using the status, the command controller 350 may determine a method to continue processing, such as by reverting the memory system 310 back to a known state.

In some examples, the timer 360 may be common to each command in the command queue. For example, if the protocol controller 325 allocates a second command to the command queue while first command is in the command queue (e.g., before the protocol controller 325 has received a response for the first command), the protocol controller 325 may refrain from modifying or resetting the timer 360. That is, if the command queue is not empty, then the protocol controller 325 may not reset the timer 360 upon allocating a command to the command queue.

In some examples, the protocol controller 325 may reset the value of the timer 360 upon receiving a response from the command controller 350. For example, after the protocol controller has initiated the timer 360 and stored the first command to the command queue, the command controller 350 may process and complete the first command, and may transmit a response associated with the first command to the protocol controller 325. Upon receiving the response, the protocol controller may deallocate the first command and may reset the timer 360 (e.g., to the initial value).

In some cases, a response which resets the timer 360 may be associated with a different command than the command which initiated the timer 360. For example, the protocol controller 325 may allocate a first command to the queue, and accordingly initiate the timer 360. The protocol controller may then allocate a second command to the command queue, and may, in response to determining that the queue is not empty (e.g., because the first command has been allocated), refrain from modifying the timer 360. In some examples, the command controller 350 may process the second command prior to processing the first command, and accordingly may transmit a response associated with the second command before processing the first command. Upon receiving the response associated with the second command, the protocol controller 325 may reset the timer 360.

In some examples, the protocol controller 325 may stop the timer 360 upon receiving a response from the command controller 350. For example, upon deallocating a command associated with the response, the protocol controller 325 may determine that the command queue is empty (e.g., that there are no pending commands in the command queue). In such an instance, the protocol controller may stop the timer 360.

In some examples, the protocol controller 325 may include multiple timers 360. For example, the protocol controller 325 may maintain a first timer associated with read commands, and a second timer associated with write commands. That is, if the protocol controller 325 receives a write command, the protocol controller 325 may initiate the first timer, and may reset or stop the timer upon receiving a response for the write command, or responses for other received write commands. Additionally or alternatively, if the protocol controller 325 receives a read command, the protocol controller 325 may initiate the second timer, and may reset or stop the timer upon receiving a response for the read command, or responses for other received read commands. Further the protocol controller 325 may maintain a timer for other types of commands, such as erase commands or other commands.

Figure 4:
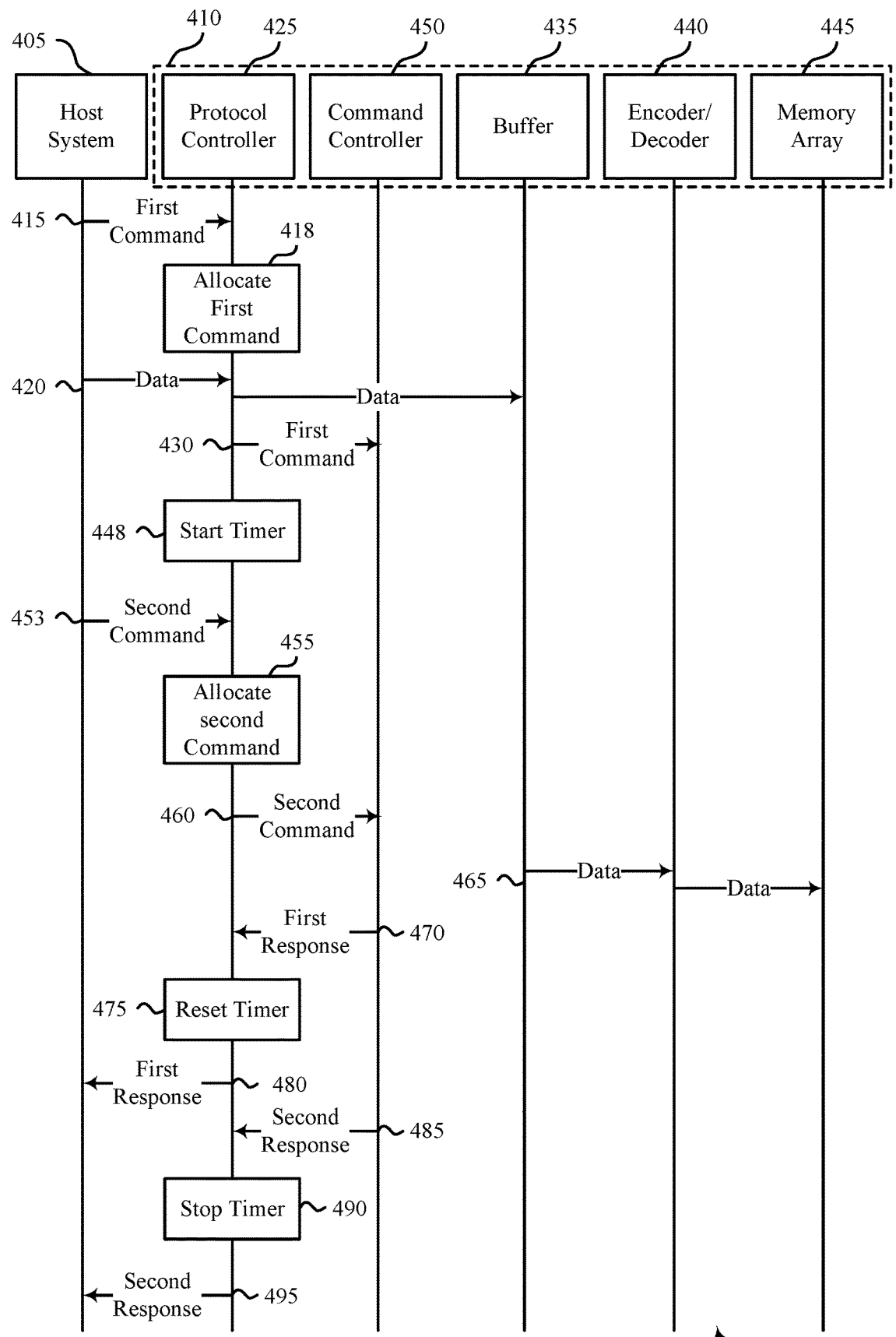
FIG. 4 illustrates an example of a process flow that supports command timer interrupt in accordance with examples as disclosed herein.

FIG. 4 illustrates an example of a process flow 400 that supports command timer interrupt in accordance with examples as disclosed herein. In some examples, the process flow 400 may illustrate operations related to managing a timer associated with one or more commands, such as one or more access commands, for data stored in a memory system 410. The memory system 410 may be coupled with a host system 405 and may include a protocol controller 425, a command controller 450, a buffer 435, an encoder/decoder 440, and a memory array 445, which may each be examples of the corresponding components as described with reference to FIG. 3. The memory system 410 may include other components, such as the components described with reference to FIG. 3, that are not shown.

At 415, the host system 405 may transmit a first command to the memory system 410, such as a write command to store data in the memory array 445. In some examples, an interface controller (e.g., the interface controller 315) may receive the first command from the host system 405. The interface controller may process the first command and issue the first command to a link controller (e.g., the link controller 320), which may in turn process and issue the first command to the protocol controller 425.

At 418, the protocol controller 425 may allocate the first command to a queue (e.g., a command queue) associated with the protocol controller 425. For example, the protocol controller 425 may write the first command to a first buffer or first register, which may store the first command until the command controller 450 is ready to process the first command. In some examples, the first command may be associated with a range of logical addresses of the memory system 410.

In some examples, at 420 and after transmitting the first command at 415, the host system 405 may transmit data associated with the command to the memory system 410 (e.g., if the first command is a write command), for example in response to a "ready to transfer" indication from the memory system 410. The interface controller may receive the data from the host system 405. The interface controller may process, for example by generating one or more protocol units associated with the data, and issue the one or more protocol units to the link controller, which may in turn process and issue the data to the protocol controller 425.

The protocol controller 425 may process the one or more protocol units, for example by generating one or more data storage units associated with the one or more protocol units, and may write the one or more data storage units to the buffer 435. In some examples, upon writing the one or more storage units, the command controller 450 may be notified that the first command may be ready for processing (e.g., via the command bus 355). Accordingly, at 430, the command controller 450 may retrieve the first command from the command queue of the command controller 450. At 448, in response to the command controller 450 retrieving the first command, the protocol controller 425 may initiate a timer. For example, the protocol controller may set a value of the timer to an initial value, and may begin running the timer.

At 453, the host system 405 may transmit a second command to the memory system 410, such as an access command for data stored in the memory array 445. In some examples, the interface controller may receive the second command from the host system 405. The interface controller may process the second command and issue the second command to the link controller, which may in turn process and issue the second command to the protocol controller 425.

At 455, the protocol controller 425 may allocate the second command to the queue associated with the protocol controller. For example, the protocol controller 425 may write the second command to a second buffer or second register, which may store the second command until the command controller 450 is ready to process the second command.

At 460, the command controller 450 may retrieve the second command from the command queue of the command controller 450. In some examples, because the command controller 450 may not yet have transmitted a response for the first command (e.g., the command controller 450 may still be processing the first command), the command queue may store the first command and the second command when the command controller 450 retrieves the second command. Accordingly, the protocol controller 425 may not reset the timer. For example, the protocol controller 425 may suppress resetting the timer in response to determining that both the first command and the second command are stored in the command queue.

At 465, the data associated with the first command may be stored in the memory array 445. For example, the one or more data storage units stored in the buffer at 420 may be transferred to the encoder/decoder 440. The encoder/decoder may process the one or more data storage units, for example by generating one or more codewords and subsequently store the one or more codewords in the memory array 445. In some examples, upon storing the one or more codewords, the command controller 450 may be notified (e.g., via the command bus) and determine that the first command has been processed. Accordingly, at 470, the command controller 450 may generate and transmit a first response for the first command to the protocol controller 425.

At 475, the protocol controller 425 may reset the timer. For example, upon receiving the first response, the protocol controller may deallocate the first command from the command queue. The protocol controller 425 may determine that the command queue is not empty (e.g., by determining that the second command is stored in the command queue), and thus determine to reset the timer. In some cases, resetting the timer may include setting the value of the timer to the initial value set at 448.

In some examples, at 480, the memory system 410 may transmit the first response to the host system 405, for example to indicate to the host system 405 that the first command was successfully processed. In such cases, the protocol controller 425 may transmit the first response to the interface controller (e.g., via the link controller), and the interface controller may transmit the first response to the host system 405. In some cases, prior to transmitting the first response to the host system 405, the protocol controller 425 may store the first response in a response queue. Upon transmitting the first response, the protocol controller may deallocate the first command from the command queue.

At 485, the command controller 450 may be notified (e.g., via the command bus) and determine that the second command has been processed. Accordingly, the command controller 450 may generate and transmit a second response for the second command to the protocol controller 425.

At 490, the protocol controller 425 may stop the timer. For example, upon receiving the second response, the protocol controller may deallocate the second command from the command queue. The protocol controller 425 may determine that the command queue is empty (e.g., by determining that no commands are stored in the command queue), and thus determine to stop the timer.

In some examples, at 495, the memory system 410 may transmit the second response to the host system 405, for example to indicate to the host system 405 that the second command was successfully processed. In such cases, the protocol controller 425 may transmit the second response to the interface controller (e.g., via the link controller), and the interface controller may transmit the first response to the host system 405.

Figure 5:
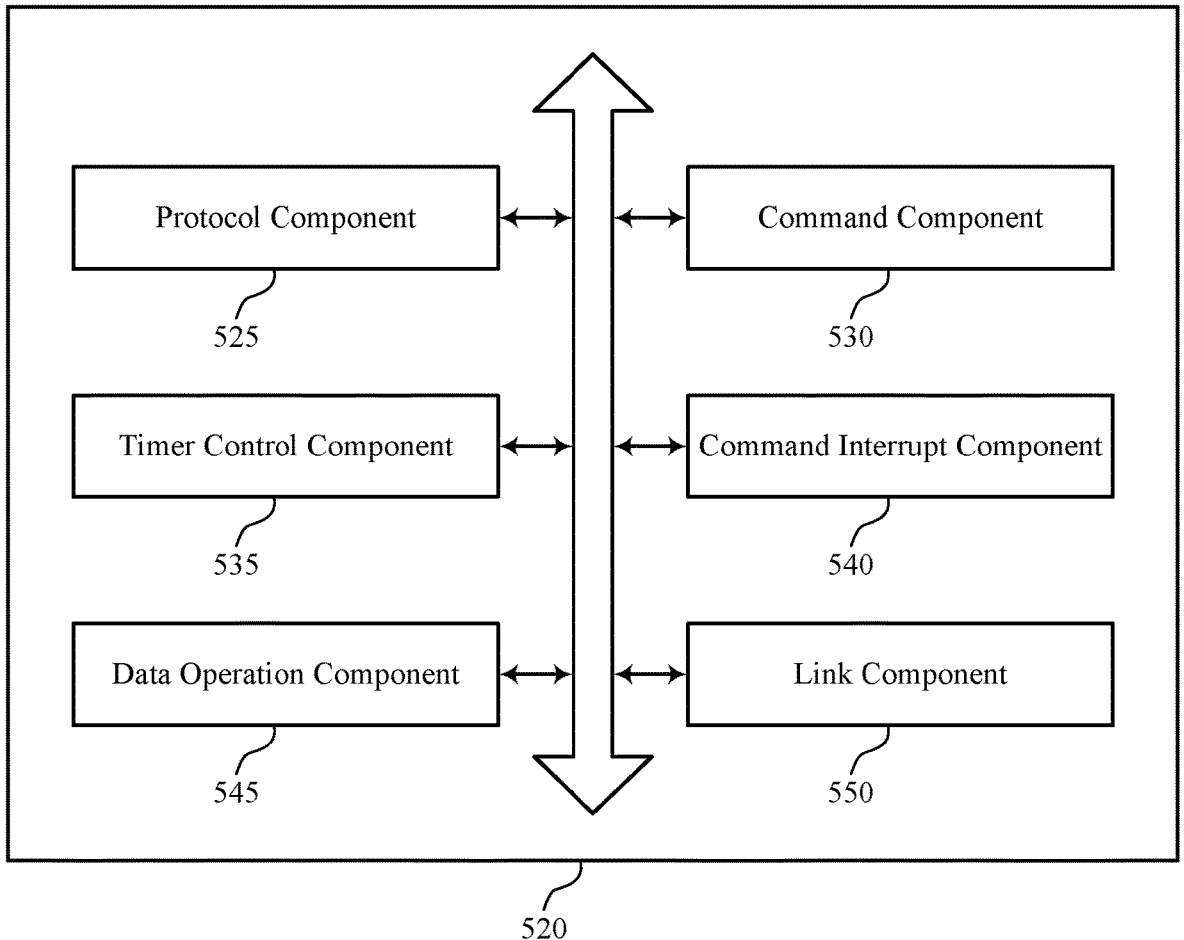
FIG. 5 shows a block diagram of a managed memory system controller that supports command timer interrupt in accordance with examples as disclosed herein.

FIG. 5 shows a block diagram 500 of a managed memory system controller 520 that supports command timer interrupt in accordance with examples as disclosed herein. The managed memory system controller 520 may be an example of aspects of a managed memory system controller as described with reference to FIGS. 1 through 4. The managed memory system controller 520, or various components thereof, may be an example of means for performing various aspects of command timer interrupt as described herein. For example, the managed memory system controller 520 may include a protocol component 525, a command component 530, a timer control component 535, a command interrupt component 540, a data operation component 545, a link component 550, or any combination thereof. Each of these components may communicate, directly or indirectly, with one another (e.g., via one or more buses).

The protocol component 525 may be configured as or otherwise support a means for receiving, at a protocol controller of a memory system, a command associated with a range of logical addresses of the memory system. The command component 530 may be configured as or otherwise support a means for transmitting an indication of the command from a queue of the protocol controller of the memory system to a command controller of the memory system. The timer control component 535 may be configured as or otherwise support a means for initiating a timer associated with the queue based at least in part on transmitting the command. The command interrupt component 540 may be configured as or otherwise support a means for issuing an interrupt command to the command controller of the memory system based at least in part on determining that the timer has expired.

In some examples, the data operation component 545 may be configured as or otherwise support a means for performing an operation on data associated with a second command based at least is part on initiating the timer. In some examples, the link component 550 may be configured as or otherwise support a means for transmitting, to a link controller, a response associated with the second command based at least in part on performing the operation.

In some examples, the command component 530 may be configured as or otherwise support a means for determining, based at least in part on transmitting the response, whether the queue is empty. In some examples, the timer control component 535 may be configured as or otherwise support a means for resetting a value of the timer based at least in part on determining that the queue is not empty.

In some examples, the command component 530 may be configured as or otherwise support a means for determining, based at least in part on transmitting the response, whether the queue is empty. In some examples, the timer control component 535 may be configured as or otherwise support a means for stopping the timer based at least in part on determining that the queue is empty.

In some examples, the protocol component 525 may be configured as or otherwise support a means for issuing the response from the command controller to a second queue of the protocol controller, where transmitting the response is based at least in part on transferring the response from the second queue to the link controller.

In some examples, the command component 530 may be configured as or otherwise support a means for deallocating, based at least in part on transmitting the response, the command from the queue, where transmitting the response is based at least in part on deallocating the command.

In some examples, the command is a same command as the second command.

In some examples, the link component 550 may be configured as or otherwise support a means for receiving, at the link controller, a third command associated with second data. In some examples, the protocol component 525 may be configured as or otherwise support a means for adding the third command to the queue of the protocol controller based at least in part on receiving the third command. In some examples, the timer control component 535 may be configured as or otherwise support a means for suppressing resetting the timer based at least in part on adding the third command to the queue.

In some examples, the data operation component 545 may be configured as or otherwise support a means for performing an operation on the second data associated with the third command. In some examples, the link component 550 may be configured as or otherwise support a means for transmitting, to the link controller, a response associated with the third command based at least in part on performing the operation. In some examples, the timer control component 535 may be configured as or otherwise support a means for resetting a value of the timer based at least in part on transmitting the response.

Figure 6:
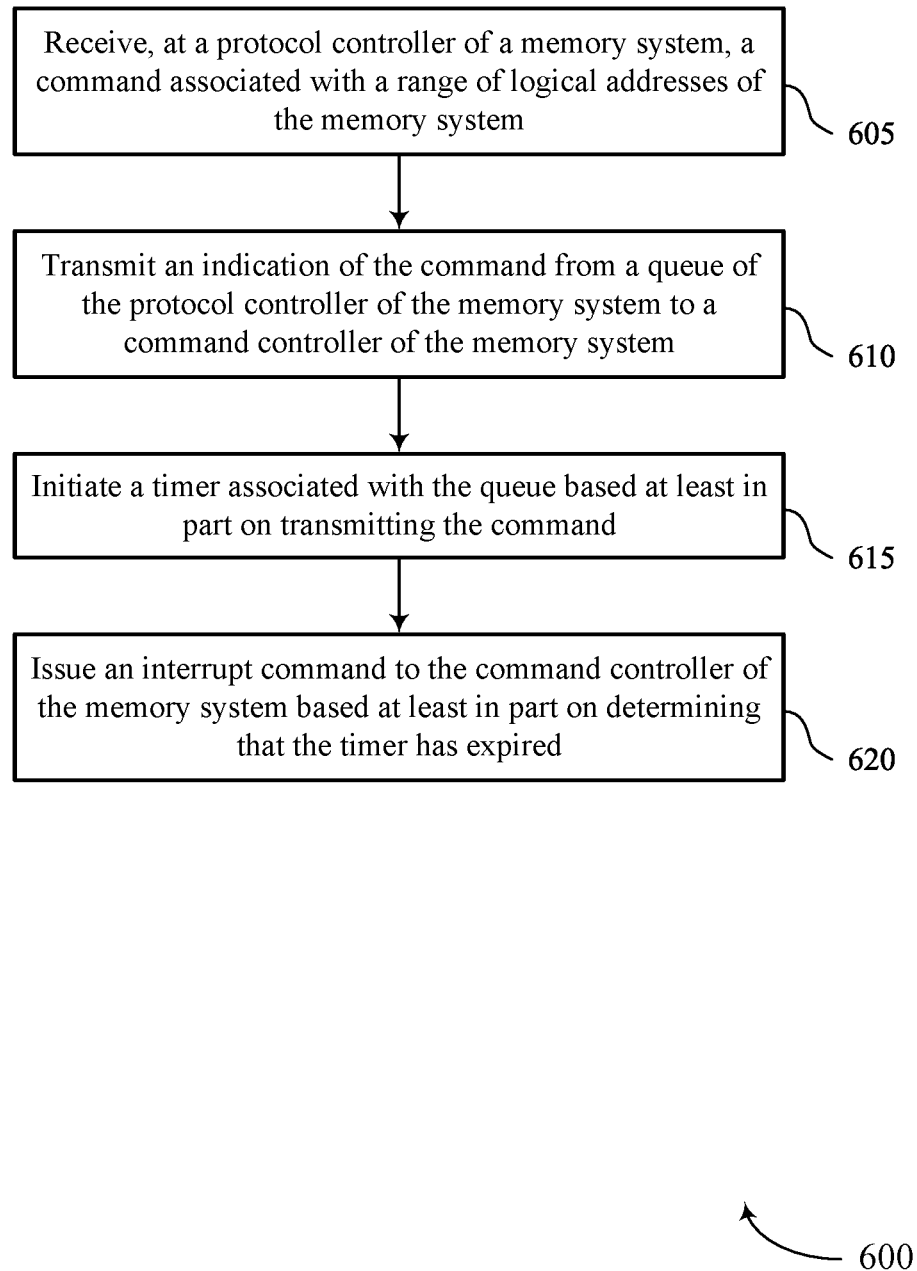
FIG. 6 shows a flowchart illustrating a method or methods that support command timer interrupt in accordance with examples as disclosed herein.

FIG. 6 shows a flowchart illustrating a method 600 that supports command timer interrupt in accordance with examples as disclosed herein. The operations of method 600 may be implemented by a managed memory system controller or its components as described herein. For example, the operations of method 600 may be performed by a managed memory system controller as described with reference to FIGS. 1 through 5. In some examples, a managed memory system controller may execute a set of instructions to control the functional elements of the device to perform the described functions. Additionally, or alternatively, the managed memory system controller may perform aspects of the described functions using special-purpose hardware.

At 605, the method may include receiving, at a protocol controller of a memory system, a command associated with a range of logical addresses of the memory system. The operations of 605 may be performed in accordance with examples as disclosed herein. In some examples, aspects of the operations of 605 may be performed by a protocol component 525 as described with reference to FIG. 5.

At 610, the method may include transmitting an indication of the command from a queue of the protocol controller of the memory system to a command controller of the memory system. The operations of 610 may be performed in accordance with examples as disclosed herein. In some examples, aspects of the operations of 610 may be performed by a command component 530 as described with reference to FIG. 5.

At 615, the method may include initiating a timer associated with the queue based at least in part on transmitting the command. The operations of 615 may be performed in accordance with examples as disclosed herein. In some examples, aspects of the operations of 615 may be performed by a timer control component 535 as described with reference to FIG. 5.

At 620, the method may include issuing an interrupt command to the command controller of the memory system based at least in part on determining that the timer has expired. The operations of 620 may be performed in accordance with examples as disclosed herein. In some examples, aspects of the operations of 620 may be performed by a command interrupt component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a protocol controller of a memory system, a command associated with a range of logical addresses of the memory system; transmitting an indication of the command from a queue of the protocol controller of the memory system to a command controller of the memory system; initiating a timer associated with the queue based at least in part on transmitting the command; and issuing an interrupt command to the command controller of the memory system based at least in part on determining that the timer has expired.

Aspect 2: The method, apparatus, or non-transitory computer-readable medium of aspect 1, further including operations, features, circuitry, logic, means, or instructions, or any combination thereof for performing an operation on data associated with a second command based at least is part on initiating the timer and transmitting, to a link controller, a response associated with the second command based at least in part on performing the operation.

Aspect 3: The method, apparatus, or non-transitory computer-readable medium of aspect 2, further including operations, features, circuitry, logic, means, or instructions, or any combination thereof for determining, based at least in part on transmitting the response, whether the queue is empty and resetting a value of the timer based at least in part on determining that the queue is not empty.

Aspect 4: The method, apparatus, or non-transitory computer-readable medium of any of aspects 2 through 3, further including operations, features, circuitry, logic, means, or instructions, or any combination thereof for determining, based at least in part on transmitting the response, whether the queue is empty and stopping the timer based at least in part on determining that the queue is empty.

Aspect 5: The method, apparatus, or non-transitory computer-readable medium of any of aspects 2 through 4, further including operations, features, circuitry, logic, means, or instructions, or any combination thereof for issuing the response from the command controller to a second queue of the protocol controller, where transmitting the response is based at least in part on transferring the response from the second queue to the link controller.

Aspect 6: The method, apparatus, or non-transitory computer-readable medium of any of aspects 2 through 5, further including operations, features, circuitry, logic, means, or instructions, or any combination thereof for deallocating, based at least in part on transmitting the response, the command from the queue, where transmitting the response is based at least in part on deallocating the command.

Aspect 7: The method, apparatus, or non-transitory computer-readable medium of any of aspects 2 through 6, where the command is a same command as the second command.

Aspect 8: The method, apparatus, or non-transitory computer-readable medium of any of aspects 2 through 7, further including operations, features, circuitry, logic, means, or instructions, or any combination thereof for receiving, at the link controller, a third command associated with second data; adding the third command to the queue of the protocol controller based at least in part on receiving the third command; and suppressing resetting the timer based at least in part on adding the third command to the queue.

Aspect 9: The method, apparatus, or non-transitory computer-readable medium of aspect 8, further including operations, features, circuitry, logic, means, or instructions, or any combination thereof for performing an operation on the second data associated with the third command; transmitting, to the link controller, a response associated with the third command based at least in part on performing the operation; and resetting a value of the timer based at least in part on transmitting the response.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on (e.g., in response to) the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising: a controller associated with a memory device, wherein the controller is configured to cause the apparatus to:
   receive, at a protocol controller of a memory system, a command associated with a range of logical addresses of the memory system;
   transmit an indication of the command from a queue of the protocol controller of the memory system to a command controller of the memory system;
   initiate a timer associated with the queue based at least in part on transmitting the command; and
   issue an interrupt command to the command controller of the memory system based at least in part on determining that the timer has expired.

2. The apparatus of claim 1, wherein the controller is further configured to cause the apparatus to:
   perform an operation on data associated with a second command based at least is part on initiating the timer; and
   transmit, to a link controller, a response associated with the second command based at least in part on performing the operation.

3. The apparatus of claim 2, wherein the controller is further configured to cause the apparatus to:
   determine, based at least in part on transmitting the response, whether the queue is empty; and
   reset a value of the timer based at least in part on determining that the queue is not empty.

4. The apparatus of claim 2, wherein the controller is further configured to cause the apparatus to:
   determine, based at least in part on transmitting the response, whether the queue is empty; and
   stop the timer based at least in part on determining that the queue is empty.

5. The apparatus of claim 2, wherein the controller is further configured to cause the apparatus to:
   issue the response from the command controller to a second queue of the protocol controller, wherein transmitting the response is based at least in part on transferring the response from the second queue to the link controller.

6. The apparatus of claim 2, wherein the controller is further configured to cause the apparatus to:
   deallocate, based at least in part on transmitting the response, the command from the queue, wherein transmitting the response is based at least in part on deallocating the command.

7. The apparatus of claim 2, wherein the command is a same command as the second command.

8. The apparatus of claim 2, wherein the controller is further configured to cause the apparatus to:
   receive, at the link controller, a third command associated with second data;
   add the third command to the queue of the protocol controller based at least in part on receiving the third command; and
   suppress resetting the timer based at least in part on adding the third command to the queue.

9. The apparatus of claim 8, wherein the controller is further configured to cause the apparatus to:
   perform an operation on the second data associated with the third command;
   transmit, to the link controller, a response associated with the third command based at least in part on performing the operation; and
   reset a value of the timer based at least in part on transmitting the response.

10. A non-transitory computer-readable medium storing code, the code comprising instructions executable by a processor to:
    receive, at a protocol controller of a memory system, a command associated with a range of logical addresses of the memory system;
    transmit an indication of the command from a queue of the protocol controller of the memory system to a command controller of the memory system;
    initiate a timer associated with the queue based at least in part on transmitting the command; and
    issue an interrupt command to the command controller of the memory system based at least in part on determining that the timer has expired.

11. The non-transitory computer-readable medium of claim 10, wherein the instructions are further executable by the processor to:
    perform an operation on data associated with a second command based at least is part on initiating the timer; and
    transmit, to a link controller, a response associated with the second command based at least in part on performing the operation.

12. The non-transitory computer-readable medium of claim 11, wherein the instructions are further executable by the processor to:
    determine, based at least in part on transmitting the response, whether the queue is empty; and
    reset a value of the timer based at least in part on determining that the queue is not empty.

13. The non-transitory computer-readable medium of claim 11, wherein the instructions are further executable by the processor to:
    determine, based at least in part on transmitting the response, whether the queue is empty; and
    stop the timer based at least in part on determining that the queue is empty.

14. The non-transitory computer-readable medium of claim 11, wherein the instructions are further executable by the processor to:
    issue the response from the command controller to a second queue of the protocol controller, wherein transmitting the response is based at least in part on transferring the response from the second queue to the link controller.

15. The non-transitory computer-readable medium of claim 11, wherein the instructions are further executable by the processor to:
    deallocate, based at least in part on transmitting the response, the command from the queue, wherein transmitting the response is based at least in part on deallocating the command.

16. The non-transitory computer-readable medium of claim 11, wherein the command is a same command as the second command.

17. The non-transitory computer-readable medium of claim 11, wherein the instructions are further executable by the processor to:
    receive, at the link controller, a third command associated with second data;
    add the third command to the queue of the protocol controller based at least in part on receiving the third command; and
    suppress resetting the timer based at least in part on adding the third command to the queue.

18. The non-transitory computer-readable medium of claim 17, wherein the instructions are further executable by the processor to:
  perform an operation on the second data associated with the third command;
  transmit, to the link controller, a response associated with the third command based at least in part on performing the operation; and
  reset a value of the timer based at least in part on transmitting the response.

19. A method, comprising:
  receiving, at a protocol controller of a memory system, a command associated with a range of logical addresses of the memory system;
  transmitting an indication of the command from a queue of the protocol controller of the memory system to a command controller of the memory system;
  initiating a timer associated with the queue based at least in part on transmitting the command; and
  issuing an interrupt command to the command controller of the memory system based at least in part on determining that the timer has expired.

20. The method of claim 19, further comprising:
  performing an operation on data associated with a second command based at least is part on initiating the timer; and
  transmitting, to a link controller, a response associated with the second command based at least in part on performing the operation.

21. The method of claim 20, further comprising:
  determining, based at least in part on transmitting the response, whether the queue is empty; and
  resetting a value of the timer based at least in part on determining that the queue is not empty.

22. The method of claim 20, further comprising:
  determining, based at least in part on transmitting the response, whether the queue is empty; and
  stopping the timer based at least in part on determining that the queue is empty.

23. The method of claim 20, further comprising:
  issuing the response from the command controller to a second queue of the protocol controller, wherein transmitting the response is based at least in part on transferring the response from the second queue to the link controller.

24. The method of claim 20, further comprising:
  deallocating, based at least in part on transmitting the response, the command from the queue, wherein transmitting the response is based at least in part on deallocating the command.

25. The method of claim 20, wherein the command is a same command as the second command.

* * * * *